June 15, 1937.  J. JONASSEN  2,083,566
MACHINE FOR MAKING MATERIAL FOR CONTAINERS, CONTAINER COVERS, AND THE LIKE
Filed April 29, 1933   11 Sheets-Sheet 4

Inventor:
Jonas Jonassen
by Charles D. King
his Attorney

June 15, 1937. J. JONASSEN 2,083,566
MACHINE FOR MAKING MATERIAL FOR CONTAINERS, CONTAINER COVERS, AND THE LIKE
Filed April 29, 1933 11 Sheets-Sheet 6

Inventor:
Jonas Jonassen
by Charles D. King
his Attorney

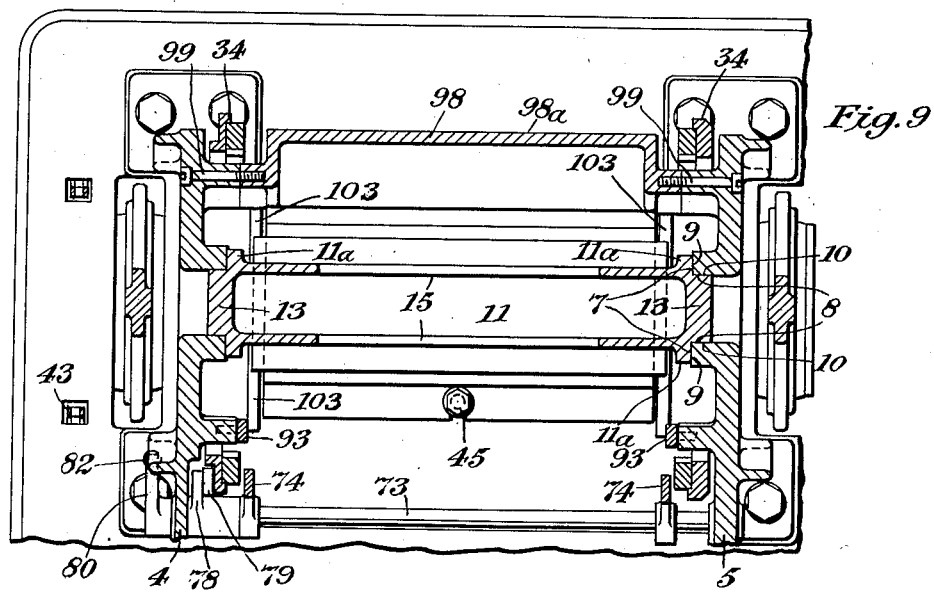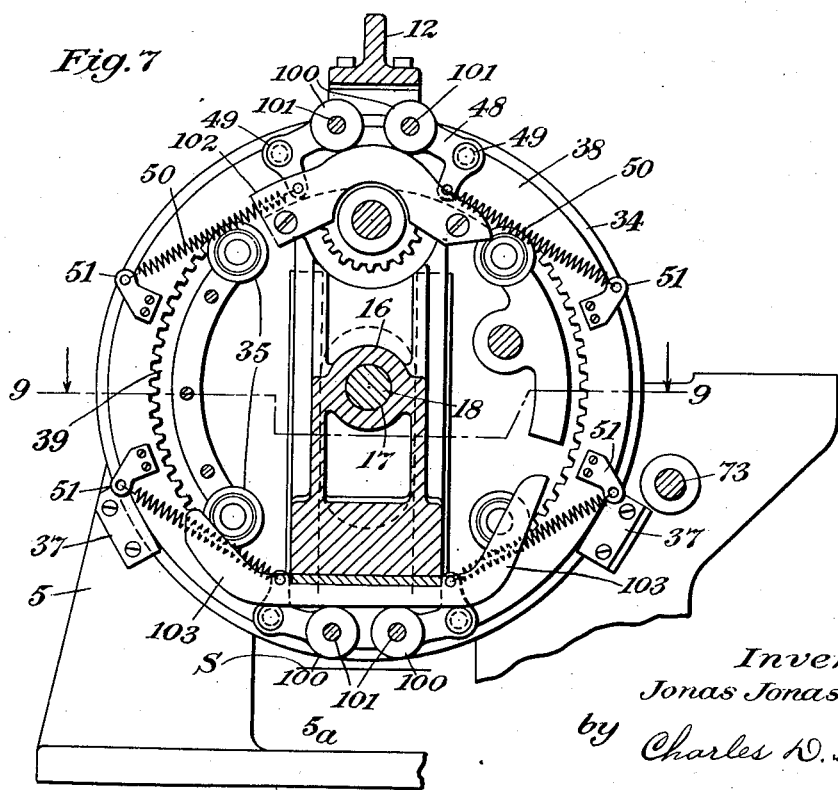

June 15, 1937.  J. JONASSEN  2,083,566
MACHINE FOR MAKING MATERIAL FOR CONTAINERS, CONTAINER COVERS, AND THE LIKE
Filed April 29, 1933  11 Sheets-Sheet 8
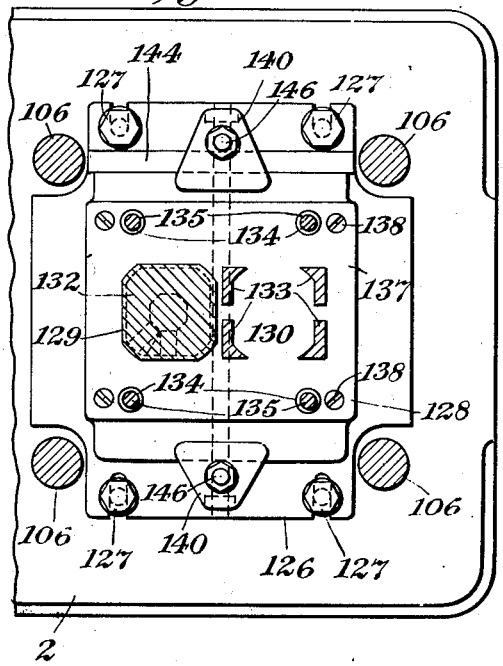
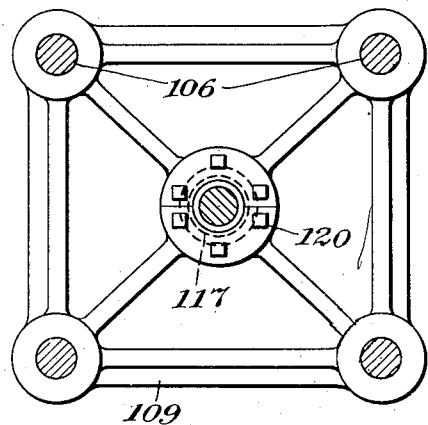
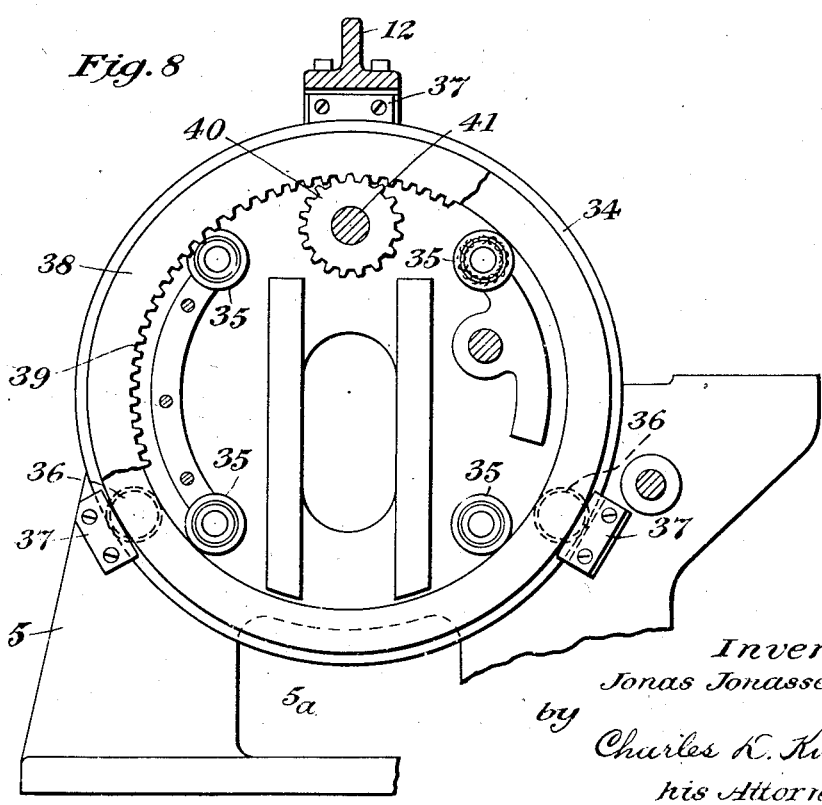
Inventor:
Jonas Jonassen
by Charles L. King
his Attorney June 15, 1937.   J. JONASSEN   2,083,566
MACHINE FOR MAKING MATERIAL FOR CONTAINERS, CONTAINER COVERS, AND THE LIKE
Filed April 29, 1933   11 Sheets-Sheet 9

Inventor:
Jonas Jonassen
by Charles D. King
his Attorney

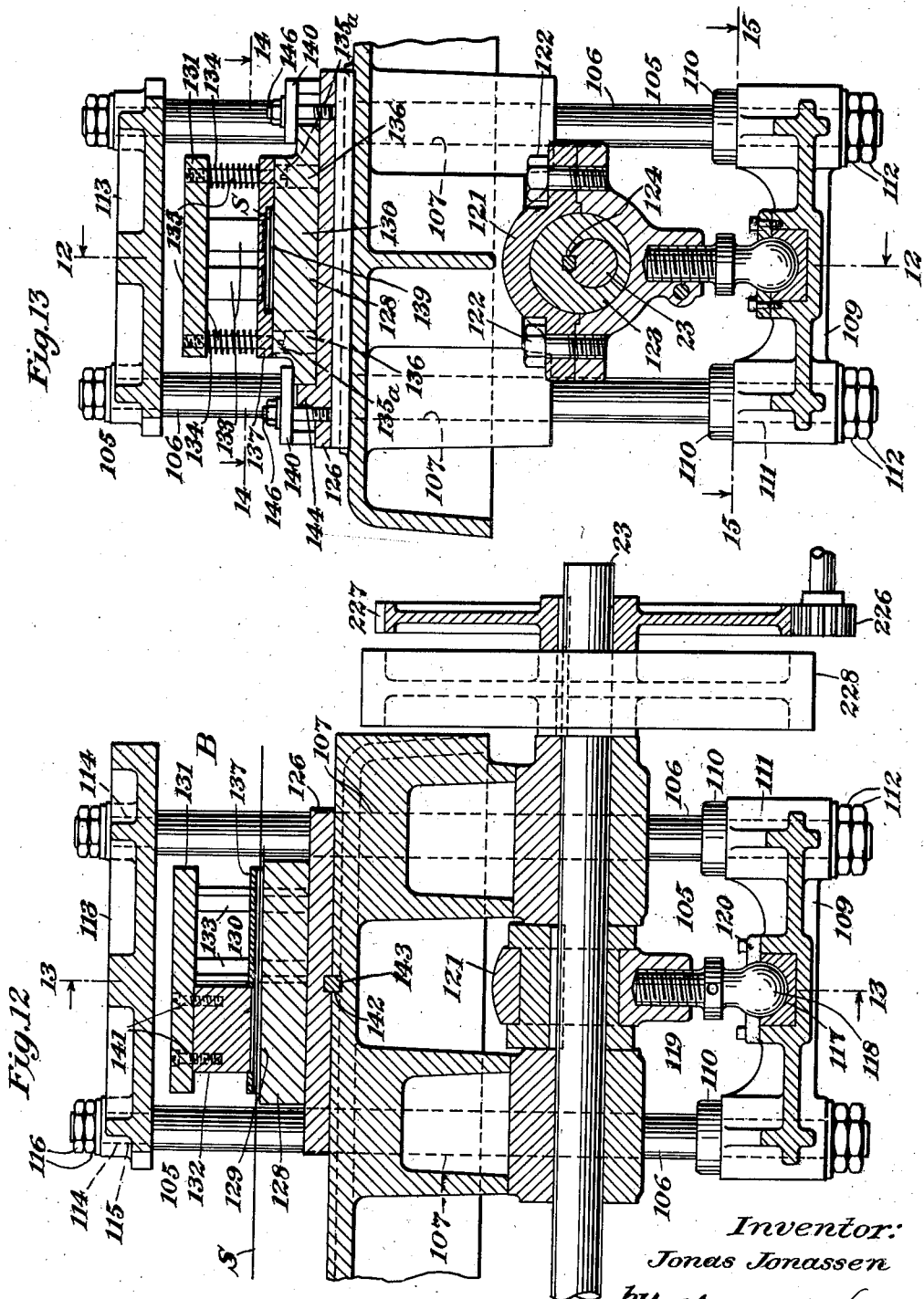

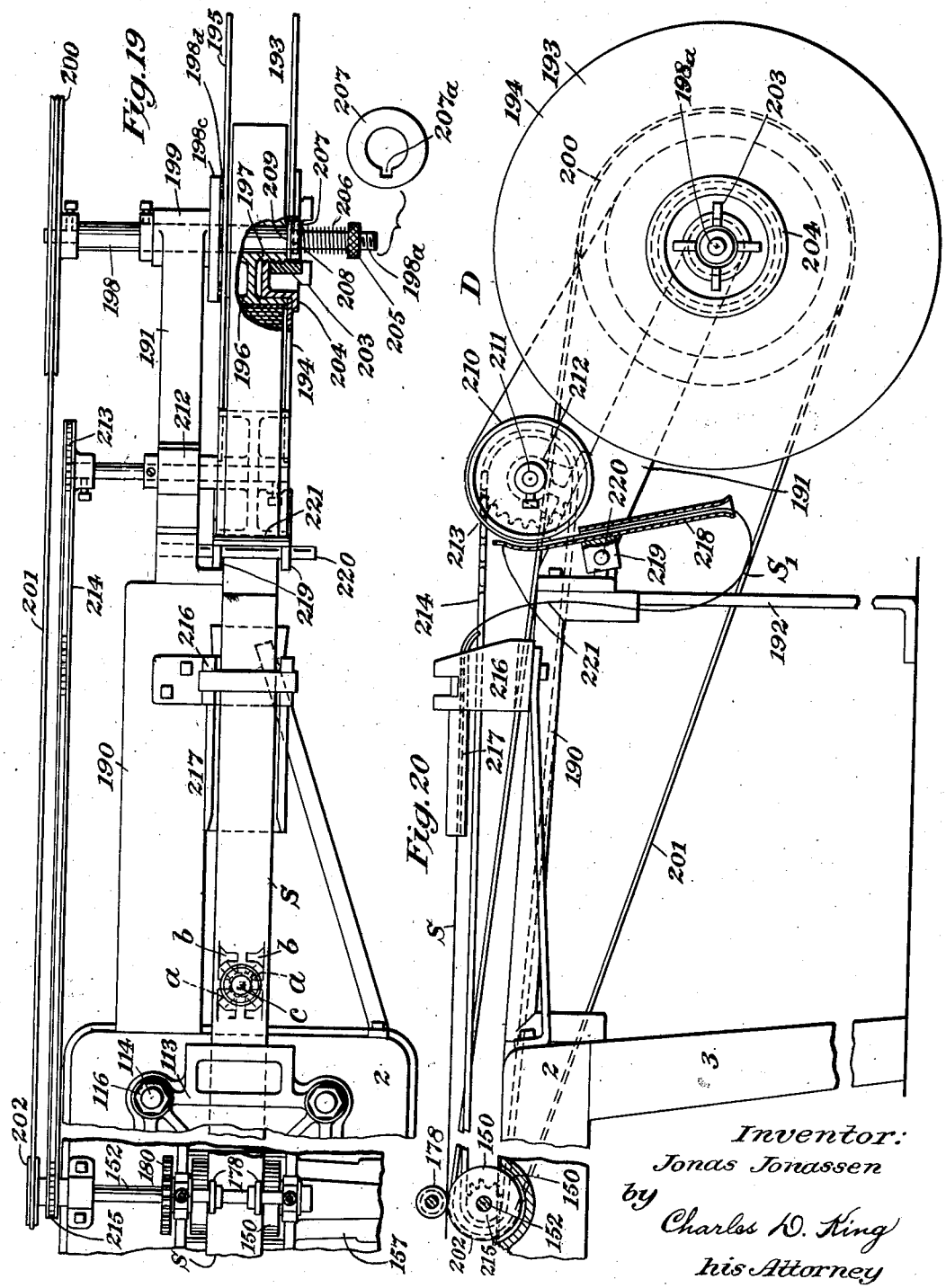

Patented June 15, 1937

2,083,566

UNITED STATES PATENT OFFICE 2,083,566

MACHINE FOR MAKING MATERIAL FOR CONTAINERS, CONTAINER COVERS, AND THE LIKE

Jonas Jonassen, Maplewood, N. J., assignor, by mesne assignments, to Tri State Cap & Cap Machinery Co., Inc., Newark, N. J., a corporation of New Jersey Application April 29, 1933, Serial No. 668,571

1 Claim. (Cl. 101—199)

This invention relates to improvements in machines for producing material for containers and covers or caps for the same, and particularly to improvements in machines for producing such material in the form of a series of blanks for such articles connected together in strips, the blanks consisting of printed matter surrounded by scorings or creasings and if desired by cut away portions for outlining said blanks.

One of the principal objects of the invention is to provide mechanism for printing container, or container cap or cover labels on a strip of sheet material, which printing mechanism is arranged in the machine in a predetermined spaced relation to stamping means for producing scorings or embossings and perforations for outlining containers, or container caps or covers around each such label.

Another object is to provide improved means for printing the labels or other matter for the tops of the container cover or other blanks, and a further object is to provide improved means for stamping or embossing scorings or creasings for outlining the tops and the folds of the container covers, and means for cutting away or perforating parts of the blanks so that they may be more readily fitted to the container necks.

Still another object is to provide rewinding or reeling mechanism whereby the strips of blanks are reeled suitably into rolls to be used on machines for applying the containers or the container covers or caps.

Still another object is to provide a machine in which the printing means and the stamping means are arranged on an elongated bed or base, provided with a single drive shaft for both said means, and a paper strip feeding means for feeding the blank material through the printing means and the stamping means in a direction parallel with the drive shaft.

The printing means in addition to the features hereinbefore mentioned embody other novel and advantageous construction. The stamping or embossing means are also of new and novel construction and arrangement. The paper strip feeding means are also arranged in an improved and novel manner.

In connection with the reeling means I have devised a tension device whereby the finished cover material is wound on the roll of the same with substantially uniform tension throughout the operation.

The embodiment of the invention which I prefer to employ is illustrated in the drawings accompanying and forming part of this specification, and in which—

Fig. 7 is a transverse vertical section taken on the line 7—7 of Fig. 2.

Fig. 8 is a detail transverse vertical section taken on the line 8—8 of Fig. 2, certain parts being omitted for clearness.

Fig. 9 is a horizontal section taken on the lines 9—9 of Figs. 5 and 7.

Fig. 11 is a developed section of a part of the inking mechanism.

Fig. 12 is a longitudinal vertical section of the stamping mechanism.

Fig. 13 is a transverse vertical section of the same taken on the line 13—13 of Fig. 12.

Fig. 14 is a sectional plan of the same taken on the line 14—14 of Fig. 13.

Fig. 15 is a sectional plan taken on the line 15—15 of Fig. 13.

Fig. 19 is a plan of the reeling mechanism for the finished container cap or other material, and Fig. 20 is a front elevation of the same.

Like characters of reference refer to like parts in all the figures of the drawings.

My herein improved machine may be utilized for any sort of articles formed from a web or strip of suitable sheet material such as paper, and while the printing and stamping means of this machine are shown as adapted to the making of container covers or caps, or to containers of suitable form, these means may be used separately or together and for such other purposes as may be desired without departing from the essence and principle of the invention as defined in the appended claim.

Figure 1:
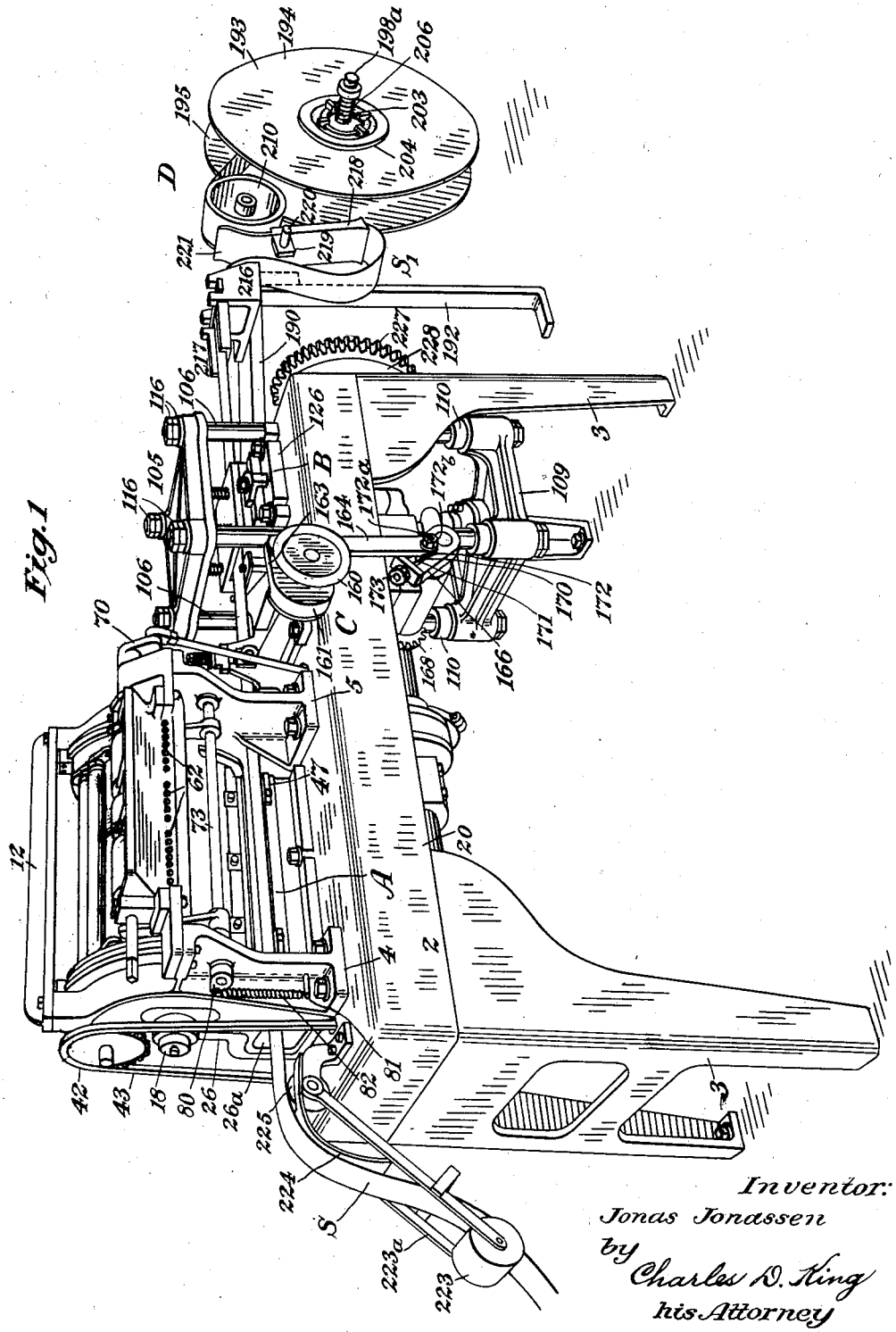
Figure 1 is a perspective view of my improved machine for producing container cover material.
Figure 2:
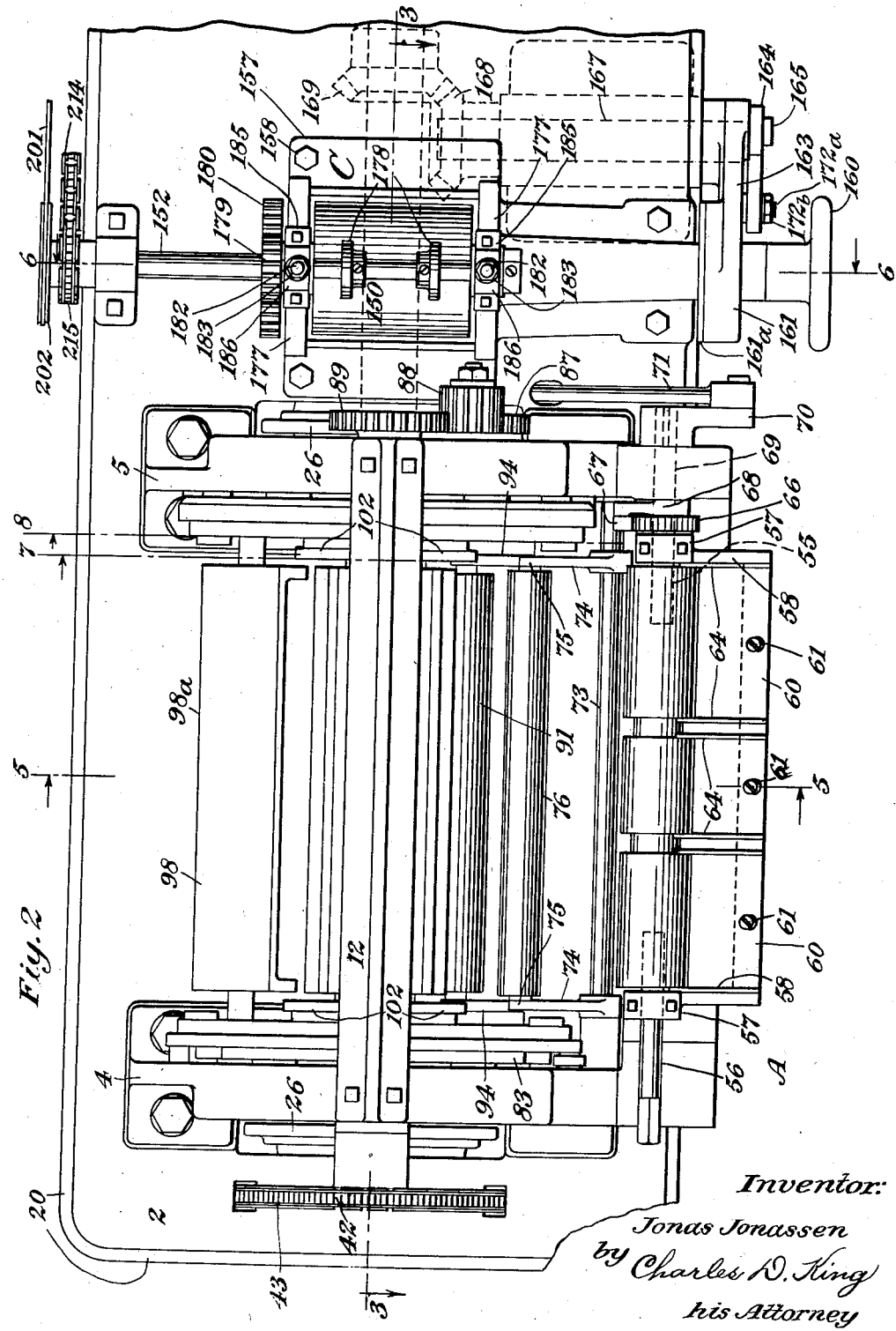
Fig. 2 is a plan of the printing mechanism of the same and a portion of the paper feeding means.

Referring to the drawings and particularly to Fig. 1, the capital letter A designates the printing means, B designates the stamping means, C denotes the mechanism for feeding the blank paper strip through the printing and stamping means, and D denotes the mechanism for reeling or forming the finished material into rolls.

The printing and stamping means are mounted on a base member which may be of any suitable form but preferably it is elongated in plan and preferably the drive shaft is arranged lengthwise of said base member, ordinarily in the underneath part. In the herein arrangement of base member and drive shaft, apertures are formed in the base member through which the actuating members for the printing bed and a separate stamping frame are movable. The printing means have a pair of operating members on the drive shaft which move the above-mentioned actuating members. There is a separate operating member on the drive shaft for operating the same. Thus it will be clear that the actuating means for the printing means and the actuating means for the stamping means are separate from each other but driven by the common shaft.

The base member is denoted by the numeral 2 and is ordinarily supported on two pairs of legs each pair indicated by 3. Mounted on the base member 2 are two upright members or pedestals 4 and 5, said pedestals being adjacent the feed or left hand of the base member as seen in Fig. 1.

*Printing mechanism*

The form bed or member for supporting the impression or printing elements or units of the printing mechanism, is carried by the pedestals 4 and 5 and under it is the platen or part 6 which supports the web or strip to be printed upon. Relative movement is produced between the printing bed and the platen and either of said members may be the movable one. In the form herein illustrated the form bed is the movable element, and it is moved preferably by means on the drive shaft connected to members extending through the before-mentioned apertures in the base member and movably connected to the platen.

Each of said pedestals is provided with two guide faces 7 and 8, each of said faces 7 and 8 being at right angles to the other and arranged in two pairs oppositely disposed in a vertical direction and forming guideways for the vertical guide faces 9 and 10 of the form bed 11.

These are formed respectively on the vertical flanges 12 of the pedestals and the vertical end parts 13 of the platen 11 and said parts are connected together by a horizontal plate 14, all three portions being further connected by vertical ribs 15. The said vertical parts 13 are furnished with bosses 16 containing apertures 17 for a pair of short shafts or pins 18.

Figure 3:
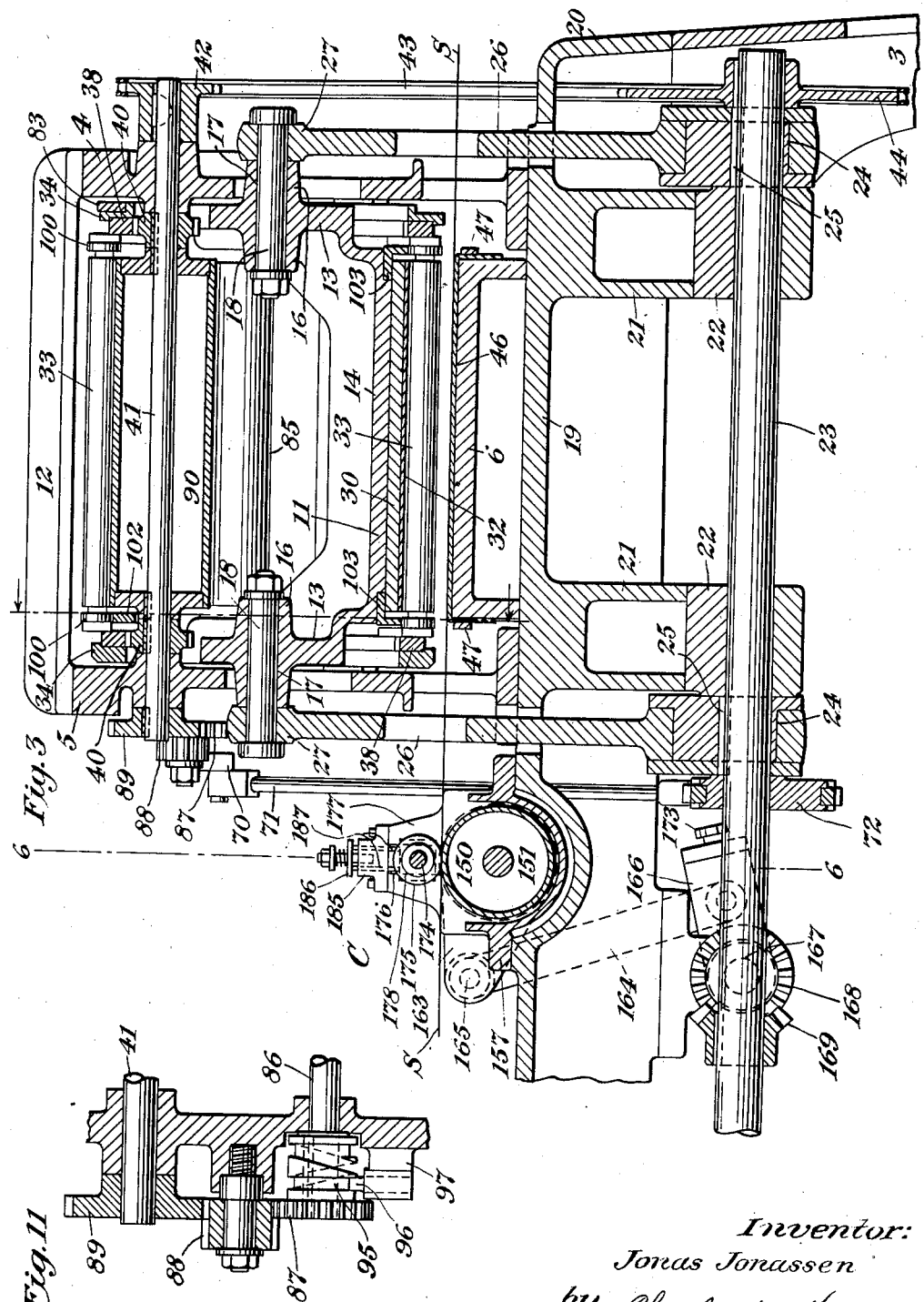
Fig. 3 is a longitudinal vertical section of the same taken on the line 3—3 of Fig. 2.
Figure 4:
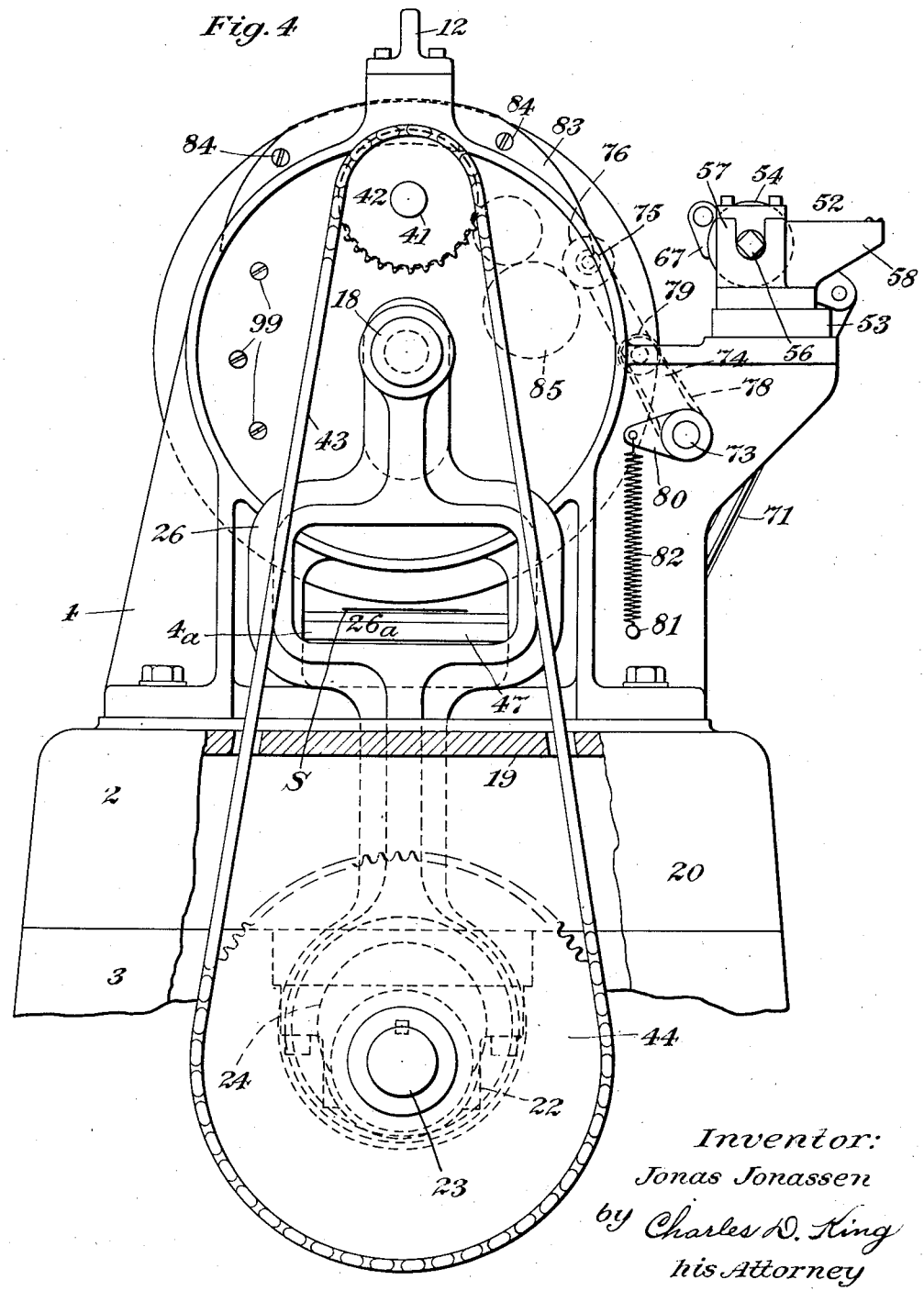
Fig. 4 is an end elevation of the printing mechanism with the base member partly broken away.

As herein shown the base member 2 is composed of a top plate 19 and depending flanges 20 at the front, rear and ends. Immediately below the pedestals 4 and 5 are two depending portions 21 to which are secured journal bearings 22 for the left hand part of the drive shaft 23, which is arranged on the base member 2 on the underneath part thereof as shown particularly in Figs. 3 and 15.

Mounted on the drive shaft 23 are two rotary members for actuating the form bed 11 which may be of any suitable type for producing reciprocating movements of the bed. Preferably the rotary members are eccentrics such as 24 secured to the shaft 23 by keys 25. The eccentrics 24 each give movement to a pitman or connecting member such as 26 having a journal bearing 27 at its upper end in which the shaft or pin 18 is journaled. Rotation of the shaft 23 produces reciprocating movement of the form bed 11.

Figure 18:
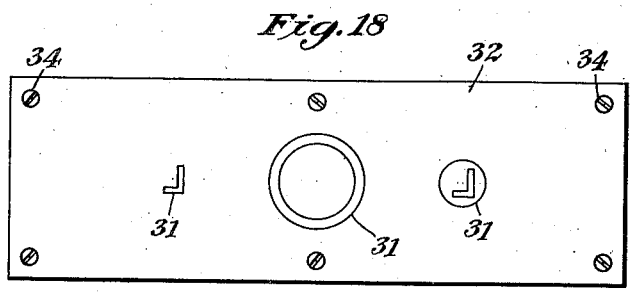
Fig. 18 is an inverted plan of an impression plate for the printing platen.
Figure 16:
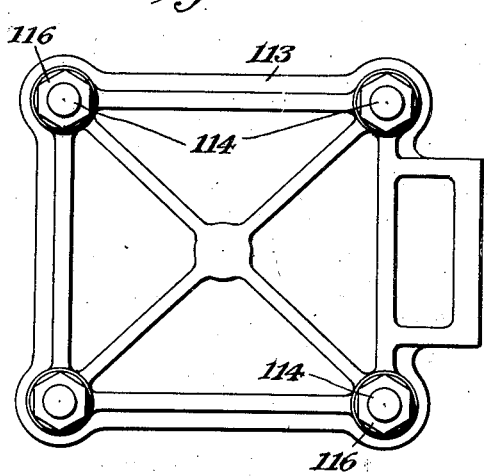
Fig. 16 is a plan of the top plate of the stamping mechanism.
Figure 17:
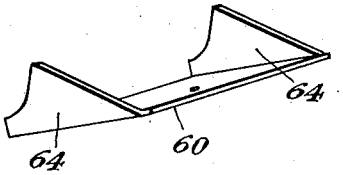
Fig. 17 is a perspective view of a partition element of the ink fount.

The elements for the actual printing may be of any suitable form and are preferably as follows:

Secured to the horizontal plate 14 by gibs 28 and set screws 29 is a movable plate 30 on which are mounted the printing elements or units which are herein shown as formed on a printing or label plate 32, having several spaced duplicate forms for multicolor printing as shown in Fig. 18. Although I have shown said label plate as one member, it may if desired be divided into several plates, one for each color on the label.

Any suitable means may be employed for supplying ink to the printing plate 32 but preferably I employ one or more inking rollers such as 33 which are periodically moved along and in contact with the printing elements by suitable devices. Preferably these encircle the form bed taking the form of rings such as 34. Said rings may be mounted in any suitable manner but preferably are mounted on the ball bearing rollers 35 and the side thrust of the rings is preferably taken by disks 36 set in suitable sockets and blocks 37 secured by suitable screws. Secured to each of said rings 34 is a second ring 38 in which internal gear teeth 39 are formed. Meshing with the gear teeth of said two rings 38 are two pinion gears 40 each secured to a shaft 41 journaled in bearings in the two pedestals 4 and 5. The said shaft 41 has a sprocket wheel 42 secured to its rearward end by means of which it is rotated and said sprocket wheel is driven by the chain 43 which is in turn driven by the driving sprocket wheel 44 suitably secured to the drive shaft 23.

The platen 6 is secured to the base member 2 by bolts 45 and is preferably provided with a cushion 46 held by clips 47. The inking rollers 33 are each mounted on a pair of resiliently arranged members such as the bell cranks 48, pivoted on the gear rings 38 by studs 49 and springs 50 secured at one end to brackets 51 and at the other to the bell cranks cause the inking rollers 33 to resiliently engage the printing elements on the platen in a manner which will hereinafter be more fully explained.

There is an ink fount 52 mounted on the pedestals 4 and 5 at one side of the form bed 11 and the rings 34 and 38. The said fount is carried on a bar 53 and has an ink roller 54 provided with shafts 55 and 56 respectively at the forward and rearward ends thereof and journaled in bearings 57 mounted on the bar 53. The said bearings are integral with end portions 58, and between said portions 58 is an inclined rigid longitudinal plate 59 and a plurality of somewhat resilient plates 60 secured thereto by screws 61 and pressed against the ink roller 54 by set screws 62 in the plate 59.

The ink fount is arranged for inks of different colors by providing grooves 63 in the roller 54 and the plates 60 have end walls 64 the upright edges of which bear in said grooves so as to prevent escape of ink, thus forming a series of compartments spaced along the fount in the direction of the web or strip feed.

The inking roller 54 is driven by the shaft 55 at the end part of which the ratchet 66 is secured. This is turned by the pawl 67, oscillated by the arm 68 on the shaft 69, which is moved by the arm 70 and that in turn by the rod 71 of the eccentric 72 mounted on the drive shaft 23. The shaft 56 supports the other end of the roller 54 in the left hand bearing 57 therefor.

Journaled in each of the pedestals 4 and 5 is a shaft 73 and secured to the same are two rock arms 74, having journal bearings 75 at their outer parts. There is a rubber roller 76 having a shaft 77 whose ends are journaled in said bearings 75. There is also a shorter rock arm 78 secured to the shaft 73 between the pedestal 4 and the adjacent rock arm 74, and having an anti-friction roller 79 secured thereon. On the outer side of the pedestal 4 is another arm 80 secured to said shaft 73 and secured between the outer end of the same and a pin 81, secured to the pedestal 4, is a tension spring 82. There is a cam 83 secured to the rotary ring 34 at the right hand side of Fig. 3 by suitable screws 84. The said cam is adapted to oscillate the shaft 73 together with the rubber roller 76 by oscillating the short arm 78 by means of its roller 79 to convey ink from the fount inking roller 54 to a distributing or oscillating roller 85. The said roller 85 is secured to a shaft 86 which is driven by a pinion 87 meshing with an idler gear 88 driven by a pinion 89 secured to the shaft 41. Also secured to the shaft 41 is a larger ink roller 90 which turns with the said shaft. There is an idler roller 91 secured to a shaft 92 journaled in journal bearings 93 in the levers 94 which are fulcrumed on the pedestals 4 and 5. The positive rotation of the roller 90 and the roller 85 cause the rotation of the idler roller 91. The roller 85 is given endwise movement by means of the rotation of the cam 95 secured to the shaft 86 and a pin 96 fixed to a bracket 97 on the pedestal 5 and against which said cam 95 operates.

There is a fixed distributing member 98 having an eccentric outer surface 98a for contact with the ink rollers 33, supported between the pedestals 4 and 5 by screws 99 and over which the inking rollers 33 pass when rotated by the rings 34 and 38. There are collars 100 on the shafts 101 of the rollers 33 to engage the cam 102, so as to positively raise the rollers 33 when they encounter the upper roller 90. There are two cams 103 which are mounted on the platen 11 and when the rollers 33 are rotated around the form bed, cause them to accurately contact with the impression elements 31.

Stamping mechanism

The stamping mechanism or means are located at the right hand end of the machine as seen in Fig. 1 and any suitable stamping means may be employed. The said means are located in a predetermined relation to the printing mechanism above-described, the said relation being determined by the spacing of the labels or other printed matter of the strip material. In other words, the dies of the stamping means must properly register with said labels or matter as they are caused to move forward by the feeding mechanism C, which is preferably located between the printing mechanism and stamping means B.

The form of stamping means I prefer to use includes a frame 105 movable up and down in the base member 2, said frame preferably having four columns or bars 106 movable in apertures 107 of the base member 2. The bars 106 are connected below the base member to a bottom plate 109 and each of said bars has a collar 110 and the portion of the bar below the column is passed into an aperture 111 in the plate 109 and secured below the same by two nuts 112.

The bars 106 are connected to the top plate 113 by shouldered portions 114 passing through apertures 115 in the top plate and secured by two nuts 116. The bottom plate 109 has a spherical socket 117 which fits the ball 118 on the lower end of the pitman 119, which ball is secured in place by an apertured square halved plate 120. The upper part of the pitman forms an eccentric strap 121 made in two portions held together by the bolts 122 and in which the eccentric 123 is rotatable on the right hand part of the drive shaft 23, being secured thereto ordinarily by a key 124.

Dies

Any suitable dies may be employed which are appropriate for the particular blanks to be formed in my improved machine. The dies shown herewith are therefore to be understood as illustrative but not limiting. Ordinarily I employ a bolster plate such as 126 secured to the base member 2 by suitable means such as bolts 127, and mounted on the bolster plate is a die plate 128 which may be provided with a plurality of sets of die elements such as two as herein shown and designated respectively by 129 and 130. The number 131 indicates the punch plate, and 132, 133, indicate respectively, two sets of punch elements co-operating respectively with two sets of die elements 129 and 130. Preferably there is a plurality of coiled springs 134 which normally hold the punch plate 131 in its retracted or up position, as shown in Figs. 1, 12, and 13.

The springs 134 are coiled around suitable members such as the screw pins 135 secured in the punch plate 131 and having heads 135a in recesses 136 in the die plate 128 so that a small vertical movement is permitted. Secured to the die plate 128 is the stripper plate 137 by screws 138, and it has a slot 139 through which the web or strip material can be fed and also limits the upward movement of the heads of the screw pins 135a. The die plate may be secured to the bolster plate in any suitable manner such as by the clamps 140. The punch elements may be secured to the punch plate in any suitable way as by screws 141 or where two parts are small by screw threading them into screw threaded apertures.

Alinement of the stamping elements is permitted in two directions at right angles to each other in the horizontal plane of the web or strip material. Preferably the bolster plate 126 is alined by the key 142 and keyway 143 in said plate and secured in position by the bolts 127. Ordinarily the bolster plate has a rib 144 placed parallel with the direction of the feed of the strip material and the die and punch is shiftable along said rib and held finally in position by the clamps 140 and bolts 146. Thus the dies and punches are readily adjustable to the line of movement of the strip material and into step with the spacing of the labels or printing thereon.

Web or strip feeding mechanism

As above noted the web or strip feeding mechanism is mounted on the base member 2 between the printing mechanism A and the stamping means B. It consists of a main feed roller 150 formed of two annular members 151 keyed to the shaft 152 and a tubular peripheral portion 153 firmly secured to said members 151. The shaft 152 is mounted in bearings 154, 155, and 156 in the frame 157, which is secured to the base member 2 by bolts 158. There is a ratchet 159 keyed to the front part of the shaft 152 and also a hand wheel 160 at the extreme front end. Surrounding the ratchet 159 is a hollow disk 161 provided with a back plate 161a secured thereto by screws 161b. There is a plurality of rollers 162, one for each tooth of the ratchet 159. The hub of the disk 161 lies between the ratchet 159 and the hand wheel 160 and is freely rotatable on the shaft 152. The said hub has an arm 163 to which the pitman 164 is pivotally connected by means of the pin 165. The pitman 164 is given up and down thrust movements by means of the crank 166 which is rotated by the shaft 167 placed at right angles to the drive shaft 23 but in the same horizontal plane therewith. The shaft 167 has a miter gear 168 secured thereto which meshes with the miter gear 169 secured to the drive shaft and hereinafter is termed the feed mechanism gear. The crank 166 has a slot 170 and an adjusting screw 171 therein on which is movable a nut 172 of which the screw-threaded pin 172a is an extension, and on an unthreaded portion of which the lower end of the pitman is journaled. A jam nut 172b holds the said pitman end in position thereon. A hub 173 is secured to the crank screw 171, which is turnable thereby for adjusting the feed of the feeding roller 150.

There is a shaft 174 in the upper part of the frame 157, carried in movable journal bearings 175 in the slots 176 in the uprights 177 of said frame. On said shaft 174 are secured two feed disks 178 which coact with the feed roller 150 for feeding the web or strip material S. The shaft 174 has a pinion 179 secured thereto meshing with the gear 180 secured to the shaft 152 and by means of which gearing the said shaft 174 is rotated.

The journal bearings 175 are yieldably and are normally pressed downwardly by means of the coil springs 181 placed around the studs 182 and secured by the collars 183 and nuts 184. The said studs 182 are mounted in yokes 185 secured to the uprights 177 and movable up and down on the studs 182 are plates 186 on which the springs 181 directly bear. Secured to each plate 186 are two short rods 187 which extend through the yokes 185 so as to press against the journal bearings 175, and thus the pressure of the springs 181 is brought to the said bearings.

The above described paper strip feeding mechanism is located before the stamping mechanism for the reason that in certain of the articles adapted to be made by this machine, perforations as hereinbefore mentioned have to be formed in the web or paper strip which weakens the latter to some extent and if the feeding should be effected by pulling the strip through both the printing mechanism and the stamping mechanism the said strip might under some conditions be torn. But by pulling the strip through the printing mechanism and pushing it through the stamping mechanism one half of the danger of tearing is eliminated and the strip is therefore fed through the machine in a highly efficient and safe manner.

Reeling or winding mechanism

The mechanism for reeling or winding up the finished web or strip material is located considerably beyond the stamping means and is indicated generally by D. It has longitudinal frame elements 190 and 191, the element 191 being secured directly to 190 by suitable bolts and the latter being supported by the strut 192. At the extreme end portion of the element 191 is the reel 193 which includes two disks 194 and 195, the disk 195 being integral with a cylindrical portion or drum 196, having a hub 197 by which it is mounted on the shaft 198, rotatable in the bearing 199 and having secured to it a grooved wheel 200 by which it is driven by a belt 201 and the latter is in turn driven by a grooved wheel 202 secured to the feed shaft 152.

The hub 197 is externally screw threaded and mounted on it is a hand nut 203 which forces the flange 204 against the disk 194. The shaft 198 is reduced in diameter and screw threaded at 198a and on it is a nut 205 which is effective for adjusting the spring 206 coiled around the portion 198a. The spring 206 bears against a collar 207 which is slotted at 207a to engage a pin 208 secured in the portion 198a of said shaft, and said collar 207 bears against the free collar 209 which in turn bears against the hub 197.

There is a drum or wheel 210 secured to a shaft 211 rotatable in a bearing 212 mounted on the frame element 191. The shaft 211 has a sprocket 213 secured to its rearward part and said sprocket is driven by a chain 214 driven in turn by the sprocket 215 on the feed shaft 152.

On the frame element 190 is secured a bracket 216 which supports the guide member or chute 217 for supporting and guiding the finished strip material, which is permitted to pass downwardly beyond it at S1 and thence to be drawn upward through the flat tube 218 which is mounted by its ears 219 on a rod 220 secured transversely on the frame element 191.

The upper part of the flat tube 218 has a resilient extension 221 in the form of a slightly bent plate secured to it and which extension normally lightly bears on the drum or wheel 210 and when the strip material is drawn around with the rotation of the drum 210, the plate 221 drags on the strip material so as to give slight amount of slack in the same at S1.

The shaft 198 has a face plate 198c having felt pads 198d which bear against the disk 195 so that the reel proper consisting of the disks 194, 195 and drum 196 is frictionally held between the face plate 198c and the flange 204 and the drum 196 can be turned on the shaft 198. The reel will therefore be turned at a slightly slower rate than the shaft 198 which difference in rates will increase as the strip material is piled higher in the reel. Thus it will be practicable to wind all amounts of the strip material with one speed of the wheel 200.

Operation

My improved machine operates as follows:

A web or strip S of suitable material in a roll is placed on a suitable reel (not shown) and the free end is passed along under the guide roller 223 of the frame 223a and over the guide 224 and guide roller 225, through the aperture 26a of the actuating member 26. It is then passed through the opening 4a in the pedestal 4, over the platen 6, through the opening 5a in the pedestal 5 and through the aperture 26a in the right hand actuating member 26, into the grip of the feed roller 150 and feed disks 178.

It is then put through the slot 139 in the stripper plate 137 and passed from there to the guide chute 217. The machine can now be started into operation by the rotation of the pinion gear 226 which turns the large gear 227 and fly wheel 228 on the drive shaft 23 starting the latter into rotation. The said pinion 226 may be mounted on the rotor shaft of a suitable electric motor or other suitable driving shaft. The end of the paper strip is now formed into a slackened portion or loop S1 just below the said chute 217 and is then passed up through the flat tube 218, partly around the cylinder or drum 210 and temporarily secured to the drum 196 of the reel 193 so as to be wound onto the same. The reel now winds up the finished material as it is formed until a roll is made equal in diameter to that of the disks 194 and 195.

As the drive shaft 23 revolves, at each revolution the eccentrics 24 lower the pitmans 26, thus also lowering the form bed 11 of the printing mechanism together with the printing elements on the plate 32 so that printed impressions are made on the strip S, usually as labels spaced from one another as desired or such other printing as may be suitable for the strip to be made.

Each revolution of the shaft 23 causes the frame 105 of the stamping mechanism to be lowered with its top plate 113. The top plate 113 presses down the punch plate 131 against the springs 134. The punch elements 132, 133, now operate, the first to emboss or crease a figure $a$ on the strip S and the latter to perforate apertures $b$ in the same but forward of the creasing.

Each creasing or embossing surrounds a printed label such as $c$ or other printed matter formed by the printing mechanism above described. The location of the die elements is such that exact registration of the stamping with the printing is effected by slight adjustments of the die elements as above described. The first half of a drive shaft revolution does the required work on the strip S, and the last half retracts the parts and operates the strip feed and reeling movements. The ratchet strip feed mechanism above described effects a forward movement of the strip on the second half of the revolution of the shaft 23 by downward movement of the crank 166 which causes a downward movement of the pitman 164, pin 165 and arm 163. This in turn causes the rollers 162 to grip the ratchet 159, thus turning the shaft 152 a portion of a revolution, together with the roller 150 and disks 178, the latter through the medium of the gears 179 and 180. The intermittent revolution of the shaft 152 also causes the reeling mechanism D to operate by means of the grooved wheels 202 and 200 and belt 201, and the sprockets 215, 213 and chain 214. In this movement the reel 193 is given intermittent motion clockwise at a speed slightly in excess of that required to wind up the strip S at the diameter of the drum 196.

There is always a slippage between the large disk 195 and the face plate 198c. This mechanism alone will effectively reel up an unperforated strip S but with perforated strips a further mechanism is desirable to prevent any tearing of the strip S. This mechanism is that including the cylinder 210, the tube 218 and the tension plate 221 and the parts supporting them. This mechanism causes a slight drag on the movement of the strip S so that the reeling is retarded. Thus a loop S1 or slack portion is formed just below the tube 218. The drum 210 has a drag on the strip S slightly in excess of that required to properly deliver it to the reel 193 and a slight slippage is present which is in no way detrimental to proper delivery.

The inking of the printing plate 32 is effected by each pair of of the rollers 33 successively when said pair passes under the plate, one inking being made for each revolution of the drive shaft 23. This operation is illustrated in Fig. 5 in which a a pair of rollers 33 is shown midway on said plate 32 and the collars 100 being shown as on the flat part of the cam 103, and the rollers 33 pressed upwardly against the plate 32 by the coil springs 50.

Figure 5:
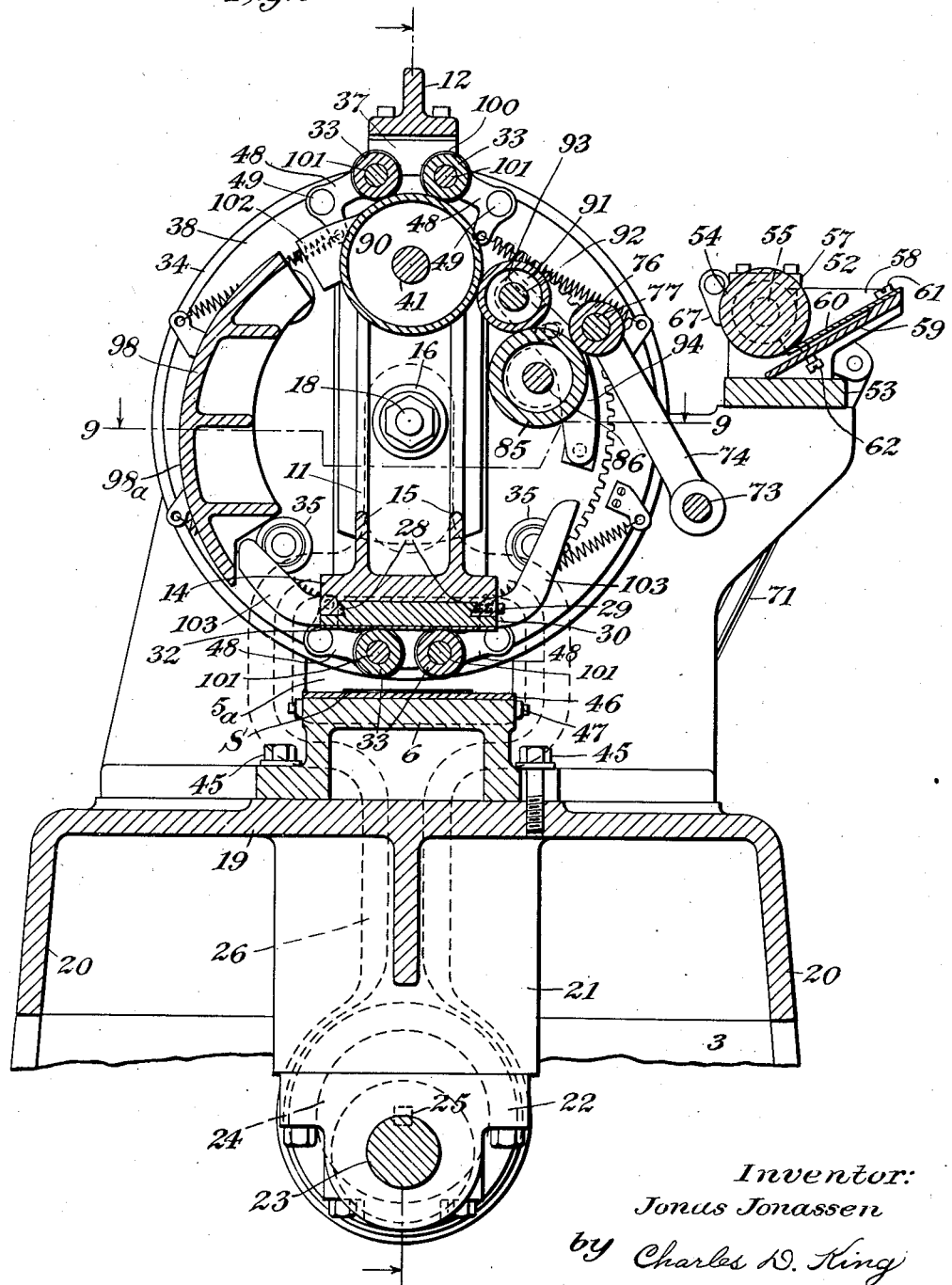
Fig. 5 is a transverse vertical section of the same taken on the line 5—5 of Fig. 2.
Figure 6:
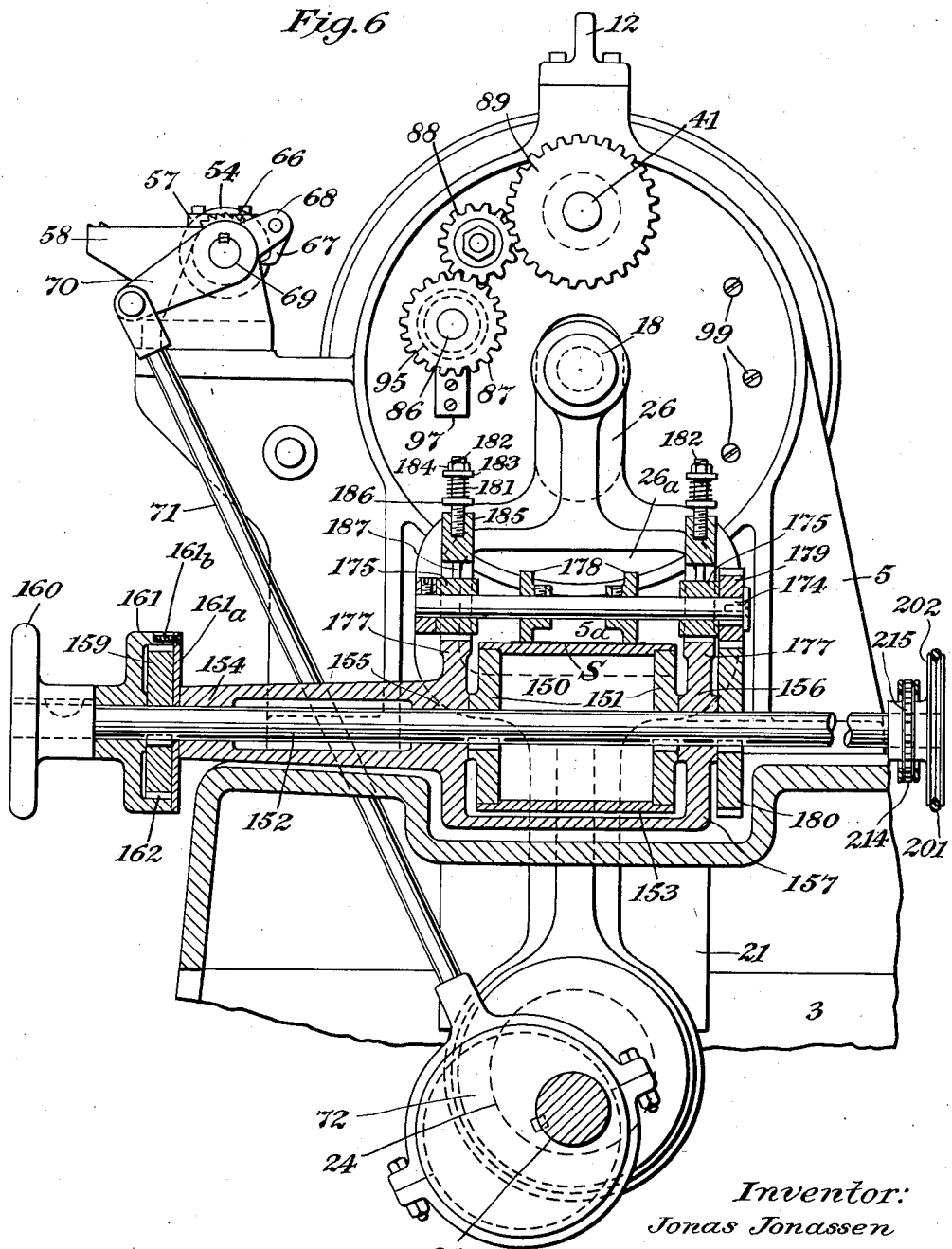
Fig. 6 is a transverse vertical section of the same taken on the line 6—6 of Fig. 2.
Figure 10:
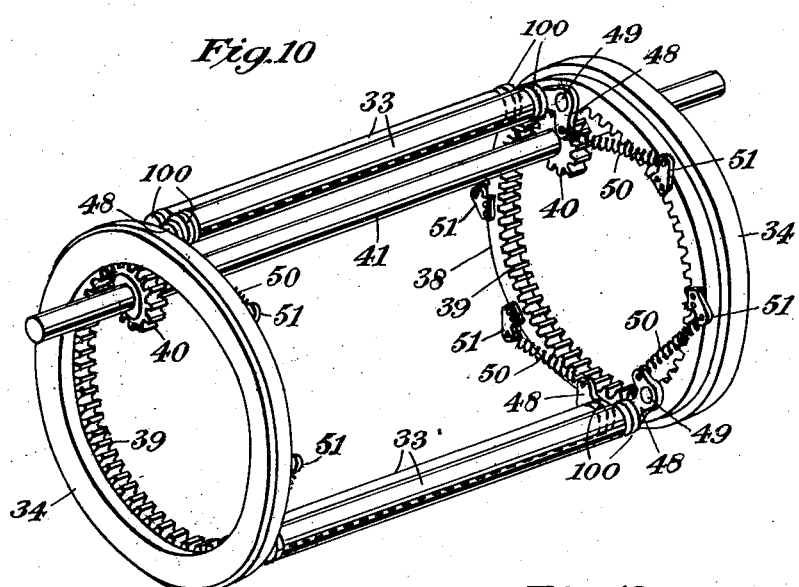
Fig. 10 is a perspective view of the form inking devices.

The inking of the rollers 33 is effected by the intermittent rotation of the roller 54 in the ink fount causing the ink to be carried out of the fount in an anti-clockwise direction as seen in Fig. 5. The back and forth movement of the rubber roller 76 carries ink from the roller 54 to the roller 85 and rotary movement of the latter carries the ink to the roller 93. The rotation of the roller 93 carries ink to the roller 90 and rotation of the latter causes ink to be carried onto the rollers 33 at the upper part of the mechanism as seen in Fig. 5. The roller 90 causes the said rollers 33 to rotate at that part of their travel. The gear rings 34 cause each pair of the rollers 33 to be carried around the form bed 11 once for each revolution of the shaft 23 or to give two revolutions of said shaft for each revolution of said rings.

Referring to Figs. 19 and 20, I have here indicated an alternative form of the reeling mechanism in which the flat tube 218 is omitted and a roller 230 (shown in broken lines) is placed over the drum 210. The roller 230 will be mounted on a suitable shaft 231 journaled in bearings 232 which will in fact be extensions of the member 212. The shaft 231 will be driven by a spur gear 233 meshing with a larger spur gear 234 on the shaft 212. In this form the finished strip passes directly to the grip of the drum 210 and roller 230 and is used for material which has no perforated parts to require the use of a slackened portion or loop S1.

It is evident that various changes and modifications may be made in my invention which will be covered by the claim and I do not therefore confine myself to the details of construction and arrangement herein shown and described.

What I claim is:

In combination, a horizontal machine bed having a plurality of vertical bearings in a set, a reciprocating frame having a plurality of vertical rods slidable in said bearings and each rod having a portion extending at all times below said bed, a top plate joining the upper ends of said rods and a bottom member joining the lower ends of said rods below the bed, means connected to said bottom member below said bed for reciprocating said frame, a die on said bed surrounded by said frame, a punch above the die adapted to be pushed down by said top plate during part of its movement downward, and spring means to move the punch upward, said punch and spring means also being surrounded by said frame.

JONAS JONASSEN.